United States Patent [19]

Podszun et al.

[11] Patent Number: 5,151,480
[45] Date of Patent: Sep. 29, 1992

[54] PROCESS FOR THE PRODUCTION OF MOULDINGS OF CROSSLINKED POLYMERS

[75] Inventors: Wolfgang Podszun, Koeln; Michael Müller, Bergisch Gladbach; Wilfried Cramer, Leverkusen; Bodo Rehbold, Koeln, all of Fed. Rep. of Germany

[73] Assignee: Bayer Aktiengesellschaft, Leverkusen, Fed. Rep. of Germany

[21] Appl. No.: 709,512

[22] Filed: Jun. 3, 1991

[30] Foreign Application Priority Data

Jun. 12, 1990 [DE] Fed. Rep. of Germany ....... 4018714

[51] Int. Cl.⁵ ............................................. C08F 230/08
[52] U.S. Cl. ................................. 526/279; 525/326.5; 526/302; 526/314
[58] Field of Search ............... 525/326.5; 526/278, 526/302

[56] References Cited

U.S. PATENT DOCUMENTS 4,446,283 1/1984 Doi et al. ....................... 525/326.5
5,045,395 9/1991 Podszun .......................... 525/326.5
5,086,141 2/1992 Georges ............................... 526/279

FOREIGN PATENT DOCUMENTS 3222344 12/1982 Fed. Rep. of Germany .

OTHER PUBLICATIONS

Abstract of JP 61 034 504.

Primary Examiner—Paul R. Michl
Assistant Examiner—Tae H. Yoon
Attorney, Agent, or Firm—Sprung Horn Kramer & Woods

[57] ABSTRACT

The invention relates to a process for the production of mouldings of crosslinked polymers by processing (moulding) of uncrosslinked copolymers of vinyl compounds and polymerisable silane compounds having 1 to 3 hydrolysable groups to give the desired mouldings and crosslinking of the copolymers in the mouldings by aftertreatment of the mouldings with acidic or alkaline aqueous solutions.

10 Claims, No Drawings

PROCESS FOR THE PRODUCTION OF MOULDINGS OF CROSSLINKED POLYMERS

The invention relates to a process for the production of mouldings of specific crosslinked polymers and to the mouldings obtainable by this process. The mouldings are filament-like or sheet-like structures, the diameter or thickness of which is <25 mm. The invention furthermore relates to the mouldings obtained by the process.

In practice, mouldings, for example monofils which can be used as optical waveguides and which not only possess excellent transparency and good mechanical strength but also have high heat distortion resistance, are desirable. The polymethacrylates proposed to date as core materials for optical waveguides, owing to their outstanding transparency and good mechanical strength, have the disadvantage that they have insufficient heat distortion resistance, so that they can be used only up to temperatures of about 80° C. Although the copolymers described in EP-A 269 223 and consisting of methyl methacrylate and N-alkylmaleimides have substantially improved heat distortion resistance, they have the disadvantage that they are difficult to process. EP-B 171 294 describes a process for the production of optical fibres having good heat distortion resistance, in which the difficulties associated with the processing of polymers having good heat distortion resistance are avoided by a procedure in which the polyfunctional compounds (crosslinking agents) imparting the heat distortion resistance are only added to the polymers during processing (during melt spinning). This process has the disadvantage of being expensive.

It has now been found that mouldings, that is to say filament-like or sheet-like structures, the diameter or thickness of which is <25 mm, preferably <10 mm, can be produced in a substantially simpler manner from crosslinked polymers, for example copolymers of (meth)acrylates, which have the properties required for optical waveguide fibres, such as high transparency, high mechanical strength and high heat distortion resistance, if vinyl compounds, for example (meth)acrylates, are polymerised together with certain polymerisable silanes, that is to say silanes having 1 to 3 hydrolysable groups, the copolymers are moulded in the desired shape, for example spun or cast to give films or sheets, and the mouldings are then postcured (crosslinked) by treatment with aqueous acids or aqueous alkalis.

It has been found, surprisingly, that the treatment of the mouldings of the uncrosslinked copolymers with the acidic or alkaline aqueous solutions leads to such extensive crosslinking of the copolymers in the mouldings that the latter have not only the required mechanical strength but also the desired heat distortion resistance at temperatures of >150° C. and that this crosslinking of the copolymers in the mouldings leads to no change in the shapes of the mouldings.

The invention therefore relates to a process for the production of mouldings of crosslinked polymers by processing (moulding) the uncrosslinked copolymers to give the desired mouldings and crosslinking the copolymers in the mouldings by aftertreatment of the mouldings, which is characterised in that copolymers of vinyl compounds and polymerisable silane compounds having 1 to 3 hydrolysable groups are used as uncrosslinked copolymers and the mouldings produced from the uncrosslinked copolymer are treated with acidic or alkaline aqueous solutions.

The invention furthermore relates to the mouldings produced by the process, that is to say mouldings of crosslinked copolymers which are obtained by copolymerisation of vinyl compounds and polymerisable silane compounds having 1 to 3 hydrolysable groups, processing of the resulting uncrosslinked copolymers to give mouldings and treatment of these mouldings in aqueous acids or aqueous alkalis.

The polymerisable silanes having 1 to 3 hydrolysable groups correspond to the formula

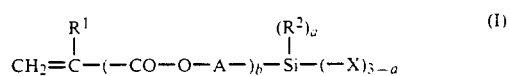

in which
R$^1$ denotes hydrogen or methyl,
A is a straight-chain or branched C$_2$-C$_{12}$-alkylene radical, the carbon chain of which may be interrupted by —O—, —NH—, —COO— or —NH—COO—,
R$^2$ represents a C$_1$-C$_6$-alkyl or a phenyl radical,
X denotes a hydrolysable group,
a may have the value zero, one or two and
b may have the value zero or one.

The following may be mentioned as examples of typical straight-chain or branched alkylene radicals having 2 to 12 C atoms: the ethylene, trimethylene, tetramethylene, pentamethylene, hexamethylene, octamethylene, decamethylene and dodecamethylene radical and the 1,2-propylene and the 1,2- and 1,3-butylene radical. The alkylene radicals which are derived from polyethers, polyamines, oligoesters or oligourethanes may be mentioned as examples of C$_2$-C$_{12}$-alkylene radicals having chains interrupted by —O—, —NH—, —COO— or —NH—COO—. A preferably represents a C$_2$-C$_8$-alkylene radical, the carbon chain of which is optionally interrupted by —O—.

The methyl, ethyl, propyl, isopropyl, butyl, isobutyl, tert-butyl, isoamyl and n-hexyl radical may be mentioned as examples of C$_1$-C$_6$-alkyl radicals R$^2$.

The following may be mentioned as examples of hydrolysable groups X: halogen atoms, preferably chlorine atoms; C$_1$-C$_6$-alkoxy groups, in particular the methoxy or ethoxy group; and carboxylate and carboxamide groups, such as the acetoxy, propionyloxy, acetylamino or propionylamino group. X preferably represents a chlorine atom or a methoxy or ethoxy group.

Silanes of the formula (I) in which a has the value zero and X represents a methoxy or ethoxy group are preferred.

The following may be mentioned as examples of silanes of the formula (I): vinyl-trimethoxysilane, vinyl-triethoxysilane, vinyl-methyl-dimethoxysilane, vinyl-methyldiethoxysilane, γ-methacryloyloxypropyl-trimethoxysilane, γ-methacryloyloxypropyl-triethoxysilane, γ-methacryloyloxypropyl-methyl-dimethoxysilane, γ-methacryloyloxypropyl-propyl-methyl-diethoxysilane, γ-acryloyloxypropyl-trimethoxysilane, γ-acryloyloxypropyl-triethoxysilane, γ-acryloyloxypropyl-methyl-dimethoxysilane and γ-acryloyloxypropyl-methyl-diethoxysilane.

Suitable vinyl monomers are the known α,β-unsaturated compounds, such as styrene, α-methylstyrene, vinyltoluene, substituted vinyltoluenes, vinylpyridine, acrylonitrile and the esters of acrylic and methacrylic acid. The esters of (meth)acrylic acid having 1 to 20 C atoms in the alcohol moiety are preferred; the following may be mentioned as examples: methyl (meth)acrylate, ethyl (meth)acrylate, n-propyl (meth)acrylate, iso-propyl (meth)acrylate, n-butyl (meth)acrylate, isobutyl (meth)acrylate, tert-butyl (meth)acrylate and 2-ethylhexyl (meth)acrylate. Methacrylates of cycloaliphatic alcohols, such as cyclohexyl methacrylate, furfuryl methacrylate, 1-adamantyl methacrylate, 2-adamantyl methacrylate, menthyl methacrylate, bornyl methacrylate, 2,2,5-trimethylcyclohexyl methacrylate and tricyclo[5.2.1.0$^{2,6}$]dec-2-yl methacrylate, are also suitable. Mixtures of various (meth)acrylates, in particular mixtures having a content of 40 to 95% by weight of methyl methacrylate, are particularly preferably used.

The mixtures of vinyl compounds of the formula (I) having 1 to 3 hydrolysable groups, which mixtures are to be used for the production, according to the invention, of the mouldings, consist of 50 to 99.5% by weight of polymerisable vinyl compounds and 50 to 0.5% by weight of silanes of the formula (I), preferably of 75 to 98% by weight of polymerisable vinyl compounds and 25 to 2% by weight of silanes of the formula (I) and particularly preferably of 85 to 98% by weight of polymerisable vinyl compounds and 15 to 2% by weight of silanes of the formula (I).

The copolymerisation of the vinyl compounds and of the silanes of the formula (I) can be carried out by the generally known polymerisation processes. Such processes are described, for example, in Houben-Weyl, Methoden der organischen Chemie (Methods of organic chemistry), 4th Edition, "Makromolekulare Stoffe" (Macromolecular substances) Part 1, G. Thieme Verlag 1987. In view of the high light transmittance of the polymers, suspension, mass and especially solution polymerisation processes are preferred. Examples of suitable solvents are toluene, xylene, ethyl acetate, butyl acetate, tert-butyl methyl ketone, tetrahydrofuran or dioxane. The polymerisation is initiated with conventional free radical formers, in particular peroxy compounds and azo compounds. The following may be mentioned as examples: dibenzoyl peroxide, dilauroyl peroxide, di-tert-butyl peroxide, dicumyl peroxide and 2,2'-azobisisobutyronitrile.

The molecular weight (weight average) of the uncrosslinked polymers are preferably from 20,000 to 500,000. Adjustment of the molecular weight is preferably controlled via the amount of initiator and the polymerisation temperature. However, it is also possible to use molecular weight regulators, such as n-propyl mercaptan, n-hexyl mercaptan or n-dodecyl mercaptan.

To produce the mouldings from the uncrosslinked polymer, the latter is spun, drawn or cast from solution or from the melt by processes known per se, for example by the melt spinning process or from solutions (see, for example, Ullmanns Encyclopedia of Industrial Chemistry, Fourth Edition, 1987, Vol. A 10, Fibers - 4; Synthetic Organic, pages 612, 613, 577 and 578).

The mouldings which can be produced according to the invention, the filament-like or sheet-like structures, the diameter or thickness of which is <25 mm, preferably <10 mm, are monofils, fibres, films and variously shaped sheets.

The treatment, according to the invention, of these mouldings of uncrosslinked copolymer is carried out in acidic or alkaline aqueous solutions, the pH of which is <2 or >13. These are preferably dilute aqueous acid or alkali solutions. The pH in these aqueous acid or alkali solutions is preferably adjusted with hydrochloric acid or sodium hydroxide solution. The treatment with the aqueous acid or alkali solutions is carried out at temperatures of 20° to 150° C., preferably at temperatures of 60° to 100° C. The reaction time is a few minutes to a few hours, depending on the chosen treatment temperature and the thickness of the mouldings. After the end of the treatment (crosslinking reaction), the moulding is heated, preferably at temperatures of 100° to 180° C. In the aftertreatment, according to the invention, of the moulding of the uncrosslinked copolymers, crosslinking of the copolymers by hydrolysis of the groups X in the polymerised silanes of the formula (II) takes place.

To increase the depth of penetration of the aqueous acid or alkali solutions into the copolymer mouldings, water-miscible organic solvents, such as tetrahydrofuran or dimethylformamide, can be added to said solutions. The process of curing of the mouldings in the acidic or alkaline aqueous solutions is evident from the fact that the copolymers are readily soluble prior to the crosslinking treatment (gel content of the solutions in tetrahydrofuran at 25° C.: <5%; softening temperature: ~100 to 130° C.). After the crosslinking reaction is complete, the copolymer mouldings are, on the other hand, insoluble (gel content in tetrahydrofuran at 25° C.:>90%; softening temperature:>250° C.).

The mouldings obtainable by the process according to the invention are distinguished from the known polymethyl methacrylates used as optical waveguides by decisively improved heat distortion resistance and solvent resistance.

EXAMPLE 1 a) Preparation of an uncrosslinked copolymer 15,000 g of anhydrous toluene, 4,750 g of freshly distilled methyl methacrylate, 250 g of 7-methacryloyloxypropyltrimethoxysilane and 33 g of anhydrous dibenzoyl peroxide are stirred for 2 hours at 80° C. in a 40 l stirred autoclave (shear rate: 200 rpm/h). The polymerisation mixture is then heated at the reflux temperature (110° C.) for a further 2 hours while stirring.

b) Isolation of the uncrosslinked copolymer obtained in a)

The solution obtained in a) was freed from the solvent and the volatile constituents in a vacuum of 10 mbar with the aid of a ZSK 32 twin-screw extruder. The melt temperature was 175° C. 4,520 g of granules were obtained. The intrinsic viscosity of the copolymer (determined in tetrahydrofuran) was 0.37 dl/g at 25° C and the gel content was 0.8% by weight. The softening temperature was 110° C. (measured on test specimens using the TMS-1 thermomechanical analyser from Perkins-Elmer, probe diameter 1 mm, compressive load 0.2 N, heating rate 5 K/min).

c) Processing the copolymer granules obtained according to b) to give a filament-like moulding The granules from step b) which had been dried for several hours in the absence of air were melted in an extrusion spinning apparatus having a devolatilisation zone and spun as monofilaments.

| Spinning conditions: | |
|---|---|
| Extruder temperature: | 200° C. |
| Die temperature: | 193° C. |
| Die (number of holes/diameter): | 1/0.5 mm |
| Screen filter: | 10,000 mesh/cm$^2$ |

-continued

Spinning conditions:

| | |
|---|---|
| Take-off: | 60 m/min |
| Throughput: | 2.8 g/min |

A transparent monofilament which was free from defects was obtained.

d) Crosslinking of the moulding obtained in c)

The melt-spun fibre was treated in a water bath (pH: 1, adjusted with HCl) for 5 hours at 96° C. It was then heated for 2 hours at 130° C. and for a further 2 hours at 150° C. in a drying oven. The gel content was then 94% by weight. Test specimens having the dimensions 4×4×2 mm were then aftertreated in the same manner for analytical purposes. In these test specimens, a gel content of 93% and a softening temperature of 250° C. were determined by the method described above.

EXAMPLE 2 a) Preparation of an uncrosslinked copolymer 4,850 g of freshly distilled methyl methacrylate and 150 g of γ-methacryloyloxypropyltrimethoxysilane in 15,000 g of anhydrous toluene were polymerised by the procedure described in Example 1a).

b) Isolation of the uncrosslinked copolymer obtained in a)

The solution obtained according to 2a) was processed to granules as described in Example 1b). 4,635 g of granules were obtained.

c) Processing of the copolymer granules obtained according to b) to give a sheet-like moulding 27 g of granules obtained according to b) were moulded in a compression mould at a temperature of 170° C. and a pressure of 200 bar to give a sheet having dimensions 100×100×2 mm. The sheet had a softening temperature of 108° C.

d) Crosslinking of the moulding obtained in c)

The sheet obtained in 2c) was treated in a solution of 100 ml of 1 N HCl in 1·1 of water for 2 hours at 60° C., for 2 hours at 80° C., for 2 hours at 90° C. and for 10 hours at 98° C. The sheet was then heated for 12 hours at 140° C. in a drying oven. A transparent sheet having a gel content of 98% and a softening temperature of 240° C. was obtained.

EXAMPLE 3

Production of a cast film from the copolymer granules obtained in Example 1b)

30 g of the granules obtained in Example 1b) were dissolved in 70 g of tetrahydrofuran. The solution was spread with the aid of a knife coater on a polytetrafluoroethylene substrate to give a 200 mm thick film. After evaporation of the tetrahydrofuran, the film was treated on the substrate, initially for 4 hours in aqueous hydrochloric acid solution (pH: 1; temperature: 96° C.), and thereafter heated first for 2 hours at 130° C. and then for a further 2 hours at 150° C. in a drying oven. After the film had been detached from the substrate, a transparent film (thickness: about 60 μm) having good heat distortion resistance was obtained.

We claim:

1. A process for the production of a molding of a cross-linked polymer comprising molding in a predetermined shape a cross-linkable but uncrosslinked copolymer of a vinyl compound and a polymerizable silane compound having 1 to 3 hydrolyzable groups, and treating the molding with an acidic or alkaline aqueous solution, thereby to effect cross-linking of the copolymer.

2. The process according to claim 1, wherein the silane compound is of the formula

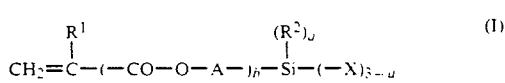

in which
R$^1$ is hydrogen or methyl,
A is a straight-chain or branched $C_2$-$C_{12}$-alkylene radical, the carbon chain of which may be interrupted by —O—, —NH—, —COO— or —NH—COO—,
R$^2$ is a $C_1$-$C_6$-alkyl or a phenyl radical,
X is a dydrolyzable group,
a is zero, one or two, and
b is zero or one.

3. The process according to claim 2, in which A is a $C_2$-$C_8$-alkylene radical, the carbon chain of which is optionally interrupted by —O—.

4. The process according to claim 2, in which X is a halogen atom, a $C_1$-$C_6$-alkoxy or a carboxylate or carboxamide group.

5. The process according to claim 2, in which X is a chlorine atom or a methoxy or an ethoxy group.

6. The process according to claim 1, in which the vinyl compound is an ester of (meth)acrylic acid having 1 to 20 C atoms in the alcohol moiety.

7. The process according to claim 1, in which the vinyl compound is a mixture of (meth)acrylates having a content of 40 to 95% by weight of methyl methacrylate.

8. The process according to claim 1, in which the copolymer comprises 50 to 99.5% by weight of the vinyl compound and 50 to 0.5% by weight of the silane.

9. The process according to claim 1, wherein the aftertreatment of the molding in the aqueous acidic or alkaline solution is carried out at a temperature of 20° to 150° C.

10. A molding produced by the process of claim 1.

* * * * *

UNITED STATES PATENT AND TRADEMARK OFFICE
CERTIFICATE OF CORRECTION

PATENT NO. : 5,151,480

DATED : September 29, 1992

INVENTOR(S) : Podszun, et al.

It is certified that error appears in the above-identified patent and that said Letters Patent is hereby corrected as shown below:

Col. 6, line 32    Delete " dydrolyzable " and substitute -- hydrolyzable --

Signed and Sealed this

Seventh Day of June, 1994

Attest:

BRUCE LEHMAN

Attesting Officer    Commissioner of Patents and Trademarks